United States Patent [19]

Verheyden, Jr.

[11] Patent Number: 4,878,838
[45] Date of Patent: Nov. 7, 1989

[54] PROCESS FOR THE THERMAL TREATMENT OF MORE PARTICULARLY SUBSTANTIALLY FLAT BODIES OF A CERAMIC MATERIAL AND CONTINUOUS FURNACE FOR THE PERFORMANCE OF THE PROCESS

[75] Inventor: G. M. C. Verheyden, Jr., Doesburg, Netherlands

[73] Assignee: A.P.T. Anlagen fur Pyrotechnik GmbH, Dusseldorf, Fed. Rep. of Germany

[21] Appl. No.: 126,536

[22] Filed: Nov. 30, 1987

[30] Foreign Application Priority Data

Nov. 28, 1986 [DE] Fed. Rep. of Germany ....... 3640727

[51] Int. Cl.4 .......................... F26B 13/00; F27B 9/02
[52] U.S. Cl. ........................................ 432/8; 432/128; 432/144; 432/152
[58] Field of Search .................... 432/48, 12, 152, 246, 432/209, 128, 144, 147, 148, 175, 176

[56] References Cited

U.S. PATENT DOCUMENTS

| | | | |
|---|---|---|---|
| 3,982,887 | 9/1976 | Kendziora et al. | 432/152 |
| 4,249,895 | 2/1981 | Mantegani | 432/128 |
| 4,397,451 | 8/1983 | Kinoshita et al. | 432/128 |
| 4,767,320 | 8/1988 | Sasaki et al. | 432/176 |
| 4,773,851 | 9/1988 | Mueller | 432/144 |
| 4,790,749 | 12/1988 | Mauro | 432/175 |

Primary Examiner—Henry C. Yuen
Attorney, Agent, or Firm—Sprung Horn Kramer & Woods

[57] ABSTRACT

The invention relates to a process and a continuous furnace for the thermal treatment of substantially flat bodies of a ceramic material. Disposed in a continuous furnace having a roller table 5, between a heating zone 1 and a cooling zone 2, is a firing zone 3 which can be divided off by partitions 6, 7 from the heating zone 1 and the cooling zone 2, and in which the bodies to be fired are very rapidly heated to firing temperature, being horizontally reciprocated to prevent deformations. During firing, the conveying of the bodies in the cooling zone 2 continues, while conveying in the heating zone 1 is interrupted, the movement of the bodies being completely stopped or the bodies being horizontally reciprocated. During the dividing-off of the firing zone 3 the gases heated in the cooling zone 2 are conducted via a bypass 12 to the heating zone 1, to participate in the heating of the bodies. While the firing zone is being emptied and is receiving bodies to be fired, the roller table 5 is driven at an increased conveying speed over a portion F2F2, F5-F6 substantially corresponding to the length of the firing zone 3 immediately upstream and downstream of the firing zone 3, while the portion F3-F4 of the firing zone itself is driven at increased conveying speed, to keep the time lost in firing as short as possible.

6 Claims, 1 Drawing Sheet

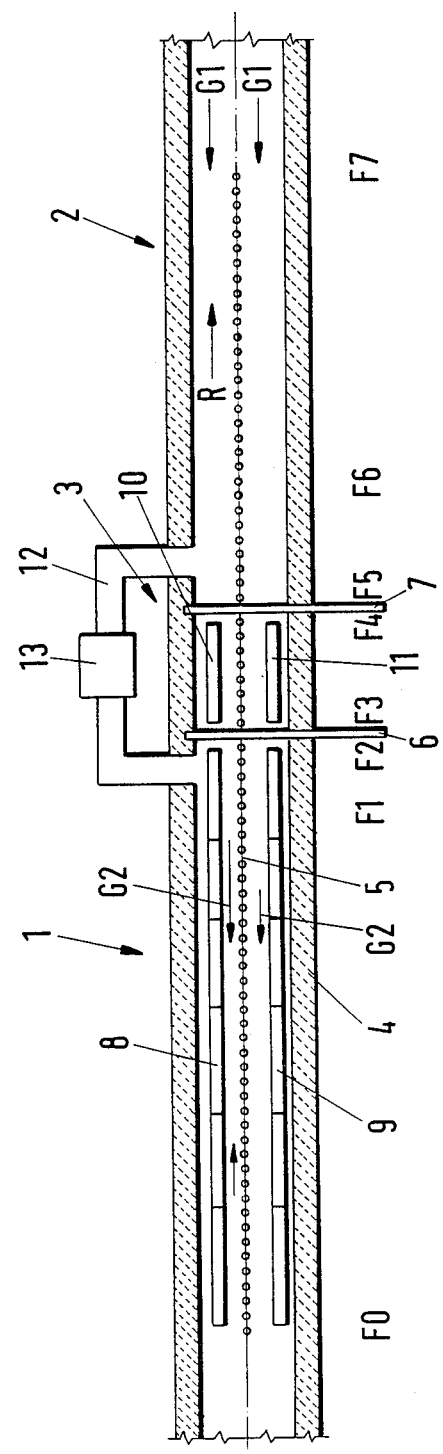

PROCESS FOR THE THERMAL TREATMENT OF MORE PARTICULARLY SUBSTANTIALLY FLAT BODIES OF A CERAMIC MATERIAL AND CONTINUOUS FURNACE FOR THE PERFORMANCE OF THE PROCESS

The invention relates to a process for the thermal treatment of more particularly substantially flat bodies of a more particularly ceramic material in a continuous furnace having conveying rollers, a heating zone, a firing zone and a cooling zone, wherein the bodies are treated in the firing zone while it is divided off from the preceding and following zones, accompanied by the continuous horizontal reciprocating movement of the bodies in the firing zone.

The invention also relates to a continuous furnace for the thermal treatment of more particularly substantially flat bodies of a more particularly ceramic material, more particularly for the performance of the process for the performance of the aforementioned, comprising a number of temperature zones disposed one behind the other, namely a heating zone, a firing zone which can be partitioned off at the front and rear, and a cooling zone through which the bodies are conveyed by means of a roller table, the portion of the roller table situated in the firing zone being adapted for horizontal reciprocating movement.

Controlling the temperature more particularly in the heating zone determines the quality of the firing of ceramic bodies. The economics of the thermal treatment process are determined by the size of the furnace, the dwell time of the bodies in the furnace and the energy required. The demand therefore exists for processes for the thermal treatment of ceramic bodies and furnaces suitable for the purposes which will ensure the manufacture of high-quality flat ceramic bodies in as economic a manner as possible.

Attempts have been made to meet these demands by using continuous furnaces subdivided into eight chambers divided off from one another and from the outside. Air is supplied to and removed from the chambers separately. No gas flow takes place in or contrary to the conveying direction of the bodies. Heat transfer takes place exclusively by radiation and convection, and a thermal recovery system can be provided for the individual chamber. During the thermal treatment in the divided-off firing chamber the bodies can be horizontally reciprocated, so that they can be fired uniformly and without sagging (Keramische Zeitschrift, 38th year of publication, No. 10, 1986, pages 626 and 627).

It is true that such a continuous furnace permits temperature control and occupies less space than conventional continuous furnaces, which are not subdivided into chambers, but it costs more than a conventional continuous furnace. Neither does that furnace provide any advantages as regards energy consumption.

It is an object of the invention to provide a process for thermal treatment, more particularly the firing of flat ceramic bodies, and a continuous furnace suitable for the performance of the method, which are economically superior to the prior art process and continuous furnace.

To this end in the process according to the invention while the bodies are treated in the firing zone, the continuous conveying in the firing zone direction of the bodies in the heating zone is interrupted, and the conveying of the bodies in the cooling zone is continued at least until the bodies have been removed from the cooling zone portion immediately following the firing zone, the thermal energy recovered from the bodies in the cooling zone being used to heat the heating zone.

According to the invention the bodies to be thermally treated are dried to a given programme, determined by the standing temperature curve in the heating zone and the conveying speed of the bodies through such zone, and heated to an elevated temperature, for example, 800° C. Heating to this temperature is non-critical for the material of the continuous furnace and requires no expensive high-temperature-resistant ceramic material, but can manage with normal stainless steel for rollers and the like. Expensive high-temperature-resistant ceramic material is required for the rollers and the like only in the firing zone, in which heating takes place up to the firing temperature, for example, 1100°. However, since in this zone the temperature can be raised abruptly without adverse effect on the quality of the bodies, the zone can be short. For this reason also the dwell time can be short, so that the total throughput is not substantially reduced in spite of the interruption of conveying. Since conveying continues in the cooling zone, at least for a certain period following the removal of the or each fired body from the firing zone, enough space is created to receive the bodies conveyed out of the firing zone. The special kind of heat recovery from the cooling zone results in a reduced energy consumption in comparison with that of a continuous furnace subdivided into individual chambers, in which no communication is possible between the individual zones, due to the individual chambers being completely divided off.

Since in contrast with the prior art furnace having a large number of chambers divided off from one another only the firing zone is constructed in the form of a divided-off zone, conventional continuous furnaces can readily be re-equipped without individual zones being divided off. Apart from incorporating the firing zone, all that needs to be provided is special controls for driving the rollers and the bypass.

According to one feature of the invention when the conveying in the direction of the firing zone of the bodies in the heating zone is interrupted, the bodies are continuously horizontally reciprocated. This counteracts the risk that the deformable flat bodies will become deformed when conveying is interrupted. So that the times required for the introduction of the bodies into the firing zone and their removal therefrom can be as short as possible, according to another feature of the invention while they are being conveyed into the firing zone and out of the firing zone, the bodies are conveyed over a portion immediately upstream and downstream of the firing zone and in the firing zone itself at a conveying speed greater than that in the other portions. Such conveying is possible because the bodies continue to be conveyed in the cooling zone while bodies are being treated in the firing zone, so that enough space is created in the portion immediately downstream of the firing zone.

Preferably the heat from the cooling zone is recovered and utilized for heating the heating zone by the feature that at least when the firing zone is partitioned-off, the gases heated by the bodies in the cooling zone are conducted via a bypass to the heating zone. Conveniently, the gases in the cooling zone are conducted in a contraflow with the conveying direction of the bodies.

The invention will now be described in greater detail with reference to a diagrammatic drawing, which is a longitudinal section through a continuous furnace suitable for the performance of the process.

A continuous furnace has a heating zone 1, a cooling zone 2 and an interposed firing zone 3. The three zones 1 to 3 are disposed in a straight line one behind the other and have a common casing 4 of heat-insulating material. A roller table 5 consisting of driven rollers extends through the zones. Individual portions of the roller table 5 can be driven independently of one another and in different ways in a manner to be disclosed in detail hereinafter.

The firing zone 3 can be partitioned off from the preceding heating zone 1 and the following cooling zone 2. For this purpose partitions 6, 7 are used which can be raised and lowered by means of drives (not shown).

Conventional heating elements, for example, heating plates 8, 9, 10, 11 disposed above and below the roller table 5 can be provided for heating the heating zone 1 and the firing zone 3. The plates conveyed on the roller table 5 are heated by radiation and convection. The heating of the individual plates 8, 9 can be controlled individually, to produce a standing temperature curve in the heating zone.

A gas flow G1, G2 takes place through both the cooling zone 2 and the heating zone 1. Gas of the flow G1 cools the fired flat bodies in the cooling zone 2. When the firing zone 3 is open, the gas thus heated passes through the firing zone 3 into the heating zone 1, while with the firing zone 3 closed, the gas passes to the heating zone 1 via a bypass 12, in which a blower 13 can be incorporated. The gas flowing in each zone oppositely to the conveying direction produces cooling in the cooling zone 2, while absorbing heat, and heating in the zone 1, while giving heat off.

After the start-up, the thermal treatment of flat ceramic bodies, such as plates, is performed in the following manner:

When the flat bodies to be fired have been conveyed into the firing zone 3 with the walls 6, 7 lowered, the walls 6, 7 are raised and the firing zone 3 thereby divided off. The temperature in the firing zone 3 is raised as quickly as possible to the firing temperature, for example, 1100° C. During firing, the fired bodies in the cooling zone 2 continue to be conveyed, at least for a certain time. The treatment time in the firing zone 3 is available for such further conveying. In any case, this time is enough to convey the bodies out of the portion F5-F6, so that enough free space is available for the bodies conveyed at an increased conveying speed following firing to the portion F5-F6. During the firing time the conveying of the bodies in the heating zone 1 in the direction of the firing zone 3 is interrupted—i.e., the bodies are not moved at all or are preferably horizontally reciprocated with a very low amplitude in comparison with the length of the heating zone 1. While horizontal reciprocatory movement is advantageous in the heating zone 1, such horizontal reciprocatory movement of the bodies is necessary in the firing zone 3, so that the bodies are uniformly heated with an abrupt increase in heating from, for example, 800° C. to 1100° C., but do not become deformed. After the bodies have been conveyed out of the portion F5-F6, they can also be stopped or preferably horizontally reciprocated in the cooling zone.

Although in this phase of operations the free passage through the furnace is interrupted by the closed walls 6, 7, heat recovery via the operative bypass 12 is maintained.

After the completion of the thermal treatment of the bodies in the firing zone 3, the walls 6, 7 are lowered. The horizontal reciprocatory movement if necessary continuing until that moment in the heating zone is stopped. The rollers in the portion F1 to F6 are driven at increased speed in the direction of the cooling zone 2. As soon as the fired bodies leave the firing zone 3 and the bodies not yet fired have been brought from the heating zone 1 into the firing 3, conveying is stopped and the heating zone 1 is again partitioned off by raising the walls 6, 7. The fired material is conveyed away at the normal conveying speed of the conveying rollers in portion F6 to F7. With normal conveying speed in the heating zone the bodies are conveyed to immediately upstream of the partition 6. Then either conveying is completely stopped in the heating zone 1 or a horizontal reciprocatory movement takes place.

I claim:

1. A process for the thermal treatment of substantially flat bodies of a ceramic material in a continuous furance having conveying rollers, a heating zone, a firing zone and a cooling zone, comprising treating the bodies in the firing zone while it is divided off from the preceding and following zones while subjecting the bodies to continuous horizontal reciprocating movement in the firing zone, while the bodies are treated in the firing zone interrupting the continuous conveying in the firing zone direction of the bodies in the heating zone, continuing the conveying of the bodies in the cooling zone at least until the bodies have been removed from the cooling zone portion immediately following the firing zone, and after the treatment of the bodies in the firing zone conveying the bodies out of the firing zone over a portion downstream of the firing zone at a conveying speed greater than that in the other portions.

2. A process according to claim 1, characterized in that at least when the firing zone is partitioned-off, the gases heated by the bodies in the cooling zone are conducted via a bypass to the heating zone.

3. A process according to claim 2, characterized in that the gases in the cooling zone are conducted in a contraflow with the conveying direction of the bodies.

4. A process according to claim 2, characterized in that the gases in the heating zone are conducted in contraflow with the conveying direction of the bodies.

5. A process according to claim 1, characterized in that when the conveying in the direction of the firing zone of the bodies in the heating zone is interrupted, the bodies are continuously horizontally reciprocated.

6. A process according to claim 1, characterized in that while they are being conveyed into the firing zone and out of the firing zone, the bodies are conveyed over a portion immediately upstream and downstream of the firing zone and in the firing zone itself at a conveying speed greater than that in the other portions.

* * * * *